United States Patent

Kanbara

[11] Patent Number: 5,973,856
[45] Date of Patent: Oct. 26, 1999

[54] LENS DRIVE CONTROLLER AND APPARATUS PROVIDED WITH DRIVE CONTROLLER

[75] Inventor: Tetsuro Kanbara, Sakai, Japan

[73] Assignee: Minolta Co., Ltd., Osaka, Japan

[21] Appl. No.: 09/093,954

[22] Filed: Jun. 8, 1998

[51] Int. Cl.⁶ .................................................. G02B 15/14
[52] U.S. Cl. .......................... 359/694; 359/695; 359/813; 359/824; 396/52; 396/72
[58] Field of Search ...................................... 359/694, 695, 359/696, 813, 824; 396/52, 55, 48, 72, 73, 79

[56] References Cited

U.S. PATENT DOCUMENTS

| | | | |
|---|---|---|---|
| 5,448,413 | 9/1995 | Kobayashi et al. | 359/695 |
| 5,684,640 | 11/1997 | Tanaka et al. | 359/694 |
| 5,742,435 | 4/1998 | Nagashima et al. | 359/696 |

FOREIGN PATENT DOCUMENTS 5-80399  2/1993  Japan .

*Primary Examiner*—Loha Ben
*Attorney, Agent, or Firm*—Morrison & Foerster LLP

[57] ABSTRACT

A controller determines the presence/absence of change in focal length caused by a zooming operation, and determines the necessity of correcting image plane shift caused by said change in focal length. Blur correction is prohibited when executing correction of image plane shift, and image plane shift is corrected by calculating the amount of movement of the focusing lens based on set focal length information, current position information of the focusing lens, and correction information stored in memory. When correction is unnecessary, the controller determines blur correction is permitted when the drive of the focusing lens ends, and executes the correction. The blur correction and the image plane shift correction are not executed simultaneously.

8 Claims, 8 Drawing Sheets

LENS DRIVE CONTROLLER AND APPARATUS PROVIDED WITH DRIVE CONTROLLER

This application is based on Application No. HEI 9-149937 filed in Japan, the content of which is hereby incorporated by reference.

BACKGROUND OF THE INVENTION

1. Field of the Invention

The present invention relates to a lens drive controller, and specifically relates to a lens drive controller suitable for zoom lens systems which electronically correct movement of the focal plane during zooming and which is provided with a device to correct image blur caused by camera movement or vibration, and apparatus provided with such drive controller.

2. Description of the Related Art

In zoom lens systems used in cameras and the like, the focal plane shifts as the focal length of the lens changes during the zooming operation. Therefore, in conventional zoom lens systems, focal plane shift is corrected by moving a focusing lens unit via a cam mechanism simultaneously with the operation that changes the focal length by moving the zooming lens unit via a cam mechanism, such that there is no shifting of the focal plane by the zooming operation.

The aforesaid construction, however, uses a plurality of cams of complex configuration, which is disadvantageous insofar as it enlarges and complicates the overall structure of the zoom lens system. To resolve these disadvantages, an electronic correction process has been proposed, that is, a central processing unit (CPU) provided in a zoom lens system calculates the amount of correction required to correct focal plane shifting caused by a zooming operation, and driving a focusing lens unit based on said calculation result.

In such electronic correction, the distance between the focal length at the wide angle end of the zoom lens element and the focal length at the telephoto end thereof is divided into a plurality of zones in advance. Then, electronic correction treats the change in focal length of the zoom lens system caused by a zooming operation as movement from one zone to another zone, and has pre-stored in memory various correction information for correcting focal plane shift related to each zone.

When a change in focal length of the zoom lens system (i.e., movement from one zone to another zone) is detected, a determination is made as to whether or not the shift in the focal plane requires correction based on the focal length information after said change and the current position information of the focusing lens unit. When the result of the aforesaid determination is that the focal plane shift must be corrected, the amount of movement of the focusing lens unit to achieve said correction is calculated based on the focal length information after said change, the current position information of the focusing lens unit, and correction information for correcting focal plane shift previously stored in memory, whereupon the focal plane shift is then corrected by moving the focusing lens unit by the calculated amount of movement.

In conventional zoom lens systems using cam mechanisms, a user can normally confirm the focused photographic object without a sense of unease because the focal plane shift is corrected without temporal delay by simultaneously moving the focusing lens unit via a cam mechanism and moving the zoom lens unit via the zooming operation. In electronic correction, however, a user may have a sense of unease unless the focusing lens unit rapidly tracks the zooming operation since the lens element CPU starts the calculation process in response to the zooming operation.

On the other hand, a correction method has been proposed wherein a blur correction lens unit is provided used in a lens system or used in a camera, so as to correct image blur caused by vibration of the camera by detecting shaking (movement) of the camera resulting from the hand shake of the operator, and driving the blur correction lens unit accordingly. Since this type of lens system and this type of camera are constructed so as to execute the zooming operation, focus detection, and exposure control and the like using a battery as a power source, the load on the battery is increased, as well as the load for calculations performed by the CPU.

Therefore, when accomplishing blur correction during a zooming operation, disadvantages arise inasmuch as there is a reduction in correction response speed to the focal plane shift, and the camera operator does not receive an excellent sense of the operation.

SUMMARY OF THE INVENTION

An object of the present invention is to eliminate the aforesaid disadvantages of the conventional art.

Another object of the present invention is to provide an improved zoom lens system.

Another object of the present invention is to provide an improved zoom lens system provided with a device to drive a lens unit for a purpose other than zooming or focusing.

Still another object of the present invention is to provide an improved zoom lens system provided with a blur correction device.

Yet another object of the present invention is to provide an apparatus provided with an improved zoom lens system.

A further object of the present invention is to provide an improved apparatus provided with a device for driving a lens unit for a purpose other than zooming or focusing.

A yet further object of the present invention is to provide an improved apparatus provided with a blur correction device.

One aspect of the present invention is to provide a plurality of lens driving devices arranged so as to independently drive a plurality of lens units constituting a lens system, and a drive power source used commonly by the plurality of lens drive devices, and a drive controller to control the operation of a plurality of lens driving devices. The drive controller executes controls so as to terminate the connection of remaining lens drive devices to the drive power source when one lens drive device must be driven based on predetermined conditions set in the lens system.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
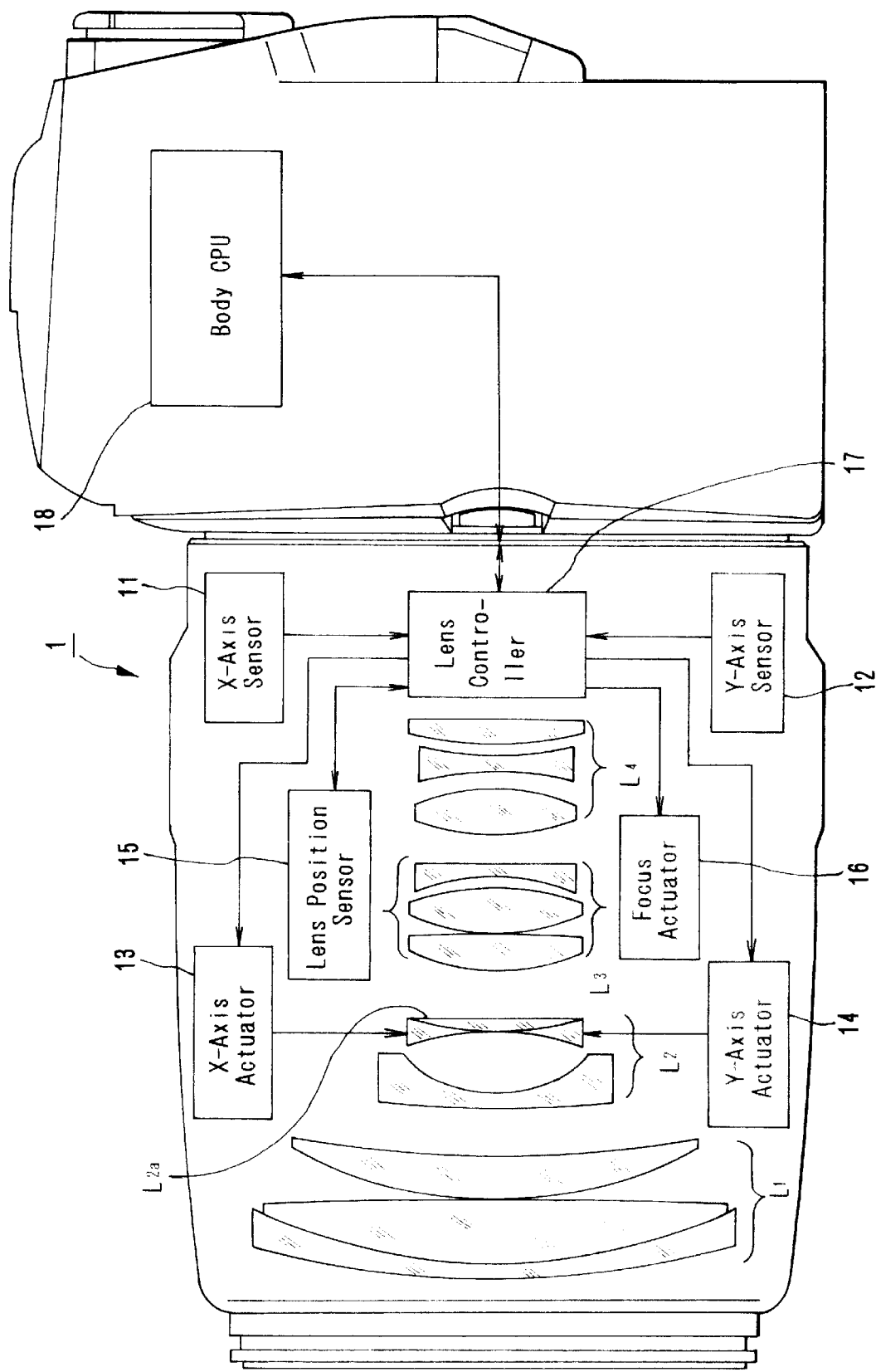
FIG. 1 is a section view briefly showing the construction of a zoom lens system of an embodiment of the present invention.

The preferred embodiments of the present invention are described hereinafter. FIG. 1 is a section view briefly showing the construction of a zoom lens system 1.

In FIG. 1, reference number 17 refers to a lens controller, and reference number 18 refers to a body CPU (central processing unit) provided in a camera body. Reference numbers L1, L2, L3, and L4 refer to lens units comprising a zoom lens system, each lens unit being constructed so as to be movable in the optical axis direction in conjunction with a zooming operation.

In lens unit L2, sub-unit L2a is used as a blur correction lens unit, and a member (described later) which holds lens element 2a is connected to an X-axis actuator 13 and a Y-axis actuator 14, such that lens unit L2a is movable in the X-axis direction and Y-axis direction within a plane perpendicular to the optical axis direction. An example of the aspect of the construction is provided later in the description. The position of the blur correction lens unit L2a in the X-axis direction and Y-axis direction is detected by X-axis sensor 11 and Y-axis sensor 12. Well-known MR sensors may be used as the X-axis sensor 11 and Y-axis sensor 12.

Lens unit L3 is used for focusing, and is constructed so as to be movable in the optical axis direction via a focus actuator 16. The position of lens unit L3 in the optical axis direction is detected by lens position sensor 15.

In the present embodiment, X-axis actuator 13, Y-axis actuator 14, and focus actuator 16 are constructed as actuators using piezoelectric elements, as described below. In this type of actuator, a movable member is frictionally connected to a drive member which is fixedly connected to a piezoelectric element. A deformation in the piezoelectric element is generated in expansion and contraction directions at different speeds when a sawtooth waveform drive pulse is applied to the piezoelectric element, so that the moving member frictionally connected to said drive member is moved in a predetermined direction.

Figure 2:
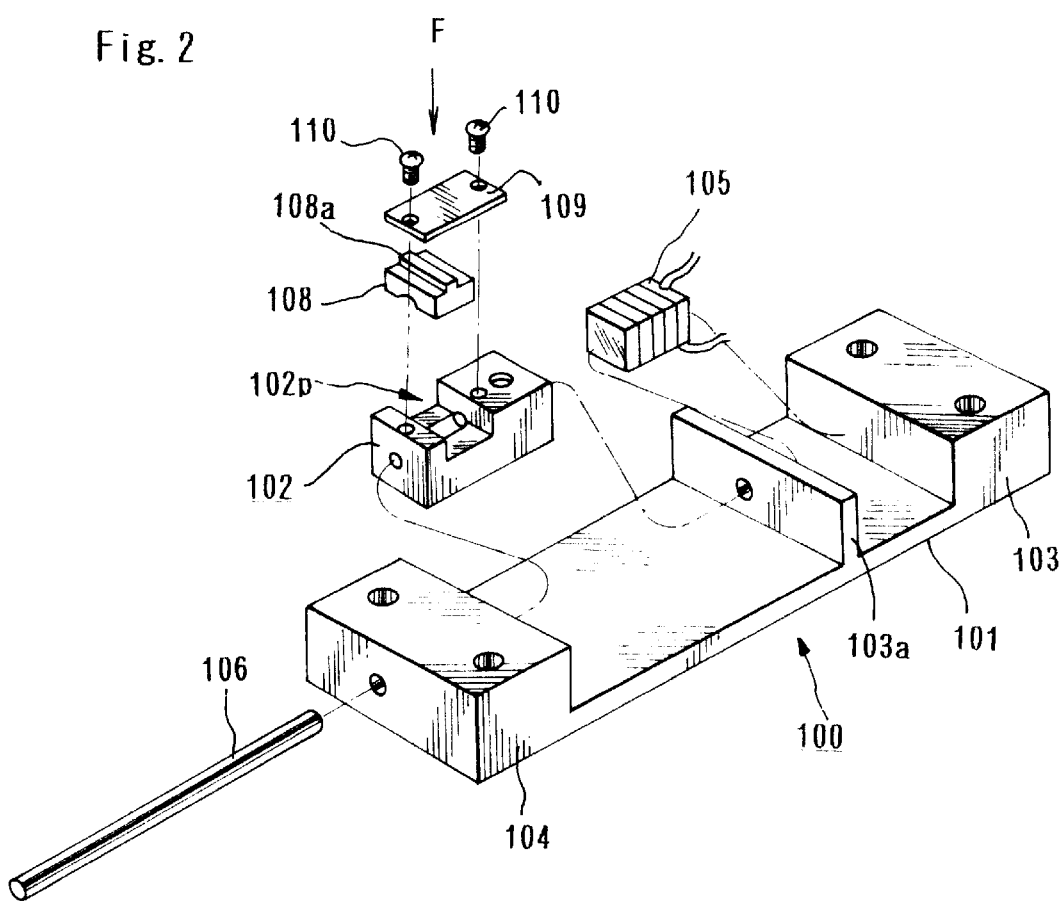
FIG. 2 is an exploded perspective view showing the structural components of an example of an actuator using piezoelectric elements.
Figure 3:
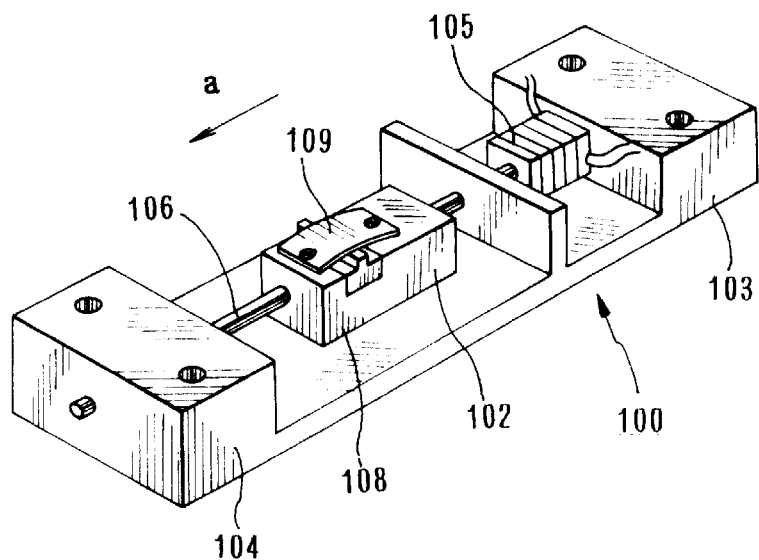
FIG. 3 is a perspective view showing the actuator of FIG. 2 in an assembled state.
Figure 4:
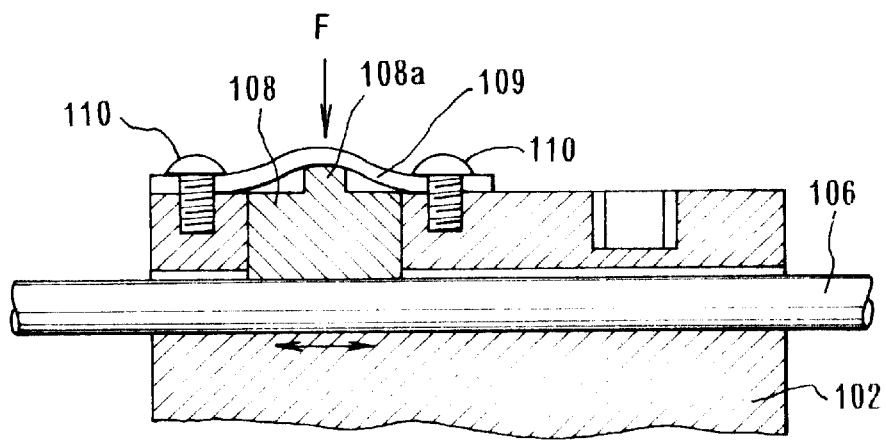
FIG. 4 is a section view showing the construction of the connector between the actuator drive shaft of FIG. 2 and the slider block and pad.

FIGS. 2–4 shows the aforesaid actuator. FIG. 2 is an exploded perspective view of the structural parts of the actuator, FIG. 3 is a perspective view of the actuator in an assembled state, and FIG. 4 is a section view of the construction of the connector between the drive shaft, slider block, and pad.

In FIGS. 2–4, actuator 100 comprises a frame 101, support blocks 103 and 104, drive shaft (drive member) 106, piezoelectric element 105, and slider block (movable member) 102. Drive shaft 106 is supported by support block 104 so as to be freely movable in the optical axis direction. One end of piezoelectric element 105 is fixedly attached to support block 103, and the other end is fixedly attached to one end of drive shaft 106. Drive shaft 106 is supported so as to be displaced in the axial direction (i.e., the arrow "a" direction, and the opposite direction thereto) when piezoelectric element 105 is deformed in the thickness direction.

A drive shaft 106 passes through slider block 102 in the lengthwise direction, and an open section 102p is formed on the top of slider block 102 through which drive shaft 106 passes so as to expose the upper half of drive shaft 106 is exposed. A pad 108 is inserted in open section 102p to contact the upper half of drive shaft 106. The top of pad 108 is provided with a projection 108a, and the projection 108a is pressed downward by a flat spring 109 so as to exert a force F downward causing pad 108 to press against drive shaft 106. Reference number 110 refers to screws which attach the flat spring 109 to the slider block 102. The construction of the connection between drive shaft 106, slider block 102, and pad 108 can be readily understood by referring to FIG. 4.

According to this construction, the drive shaft 106 and slider block 102 including the pad 108 are pressed against one another via the force F exerted by flat spring 109 so as to be frictionally connected.

Figure 5:
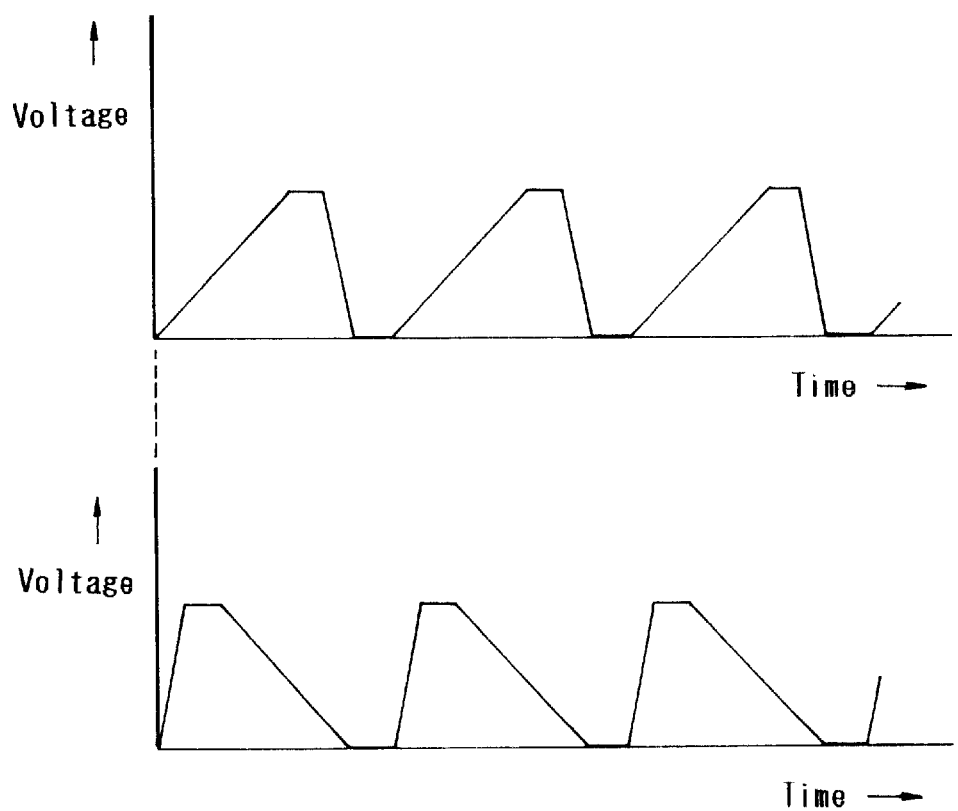
FIG. 5 illustrates the drive pulse waveform which drive the actuator.

The operation of this device is described below. First, when a sawtooth-shaped drive pulse having a moderately rising component and a sharply falling component as indicated in upper part of FIG. 5 is applied to piezoelectric element 105, the gently rising component of the drive pulse causes a moderate expansion displacement of piezoelectric element 105 in the width direction, so as to also moderately displace drive shaft 106 connected to piezoelectric element 105 in a positive direction (arrow "a" direction). At this time, the slider block 102 is moved in the positive direction together with drive shaft 106 via the force of the friction.

The sharply falling component of the drive pulse causes a rapid contraction displacement of piezoelectric element 105 in the thickness direction, so as to also rapidly displace drive shaft 106 connected to said piezoelectric element 105 in the negative direction (direction opposite of the arrow "a" direction). At this time, the slider block 102 substantially remains at its position due to the inertia and is not moved. The slider block 102 is consecutively moved in the positive direction by consecutive applications of the aforesaid drive pulse to the piezoelectric element 105.

Further, "substantially remains" mentioned in the above includes a case where the slider block 102 follows the drive shaft 106 while causing a slippage on contacting surfaces therebetween in either of the positive and negative directions and moved in the arrow "a" direction as a whole by a difference in drive time periods.

The movement of slider block 102 in the negative direction (direction opposite the arrow a direction) is accomplished by changing the sawtooth-shaped drive pulse waveform applied to piezoelectric element 105, so that the drive pulse comprises a sharply rising component and a moderately falling component as shown in lower part of FIG. 5.

Figure 6:
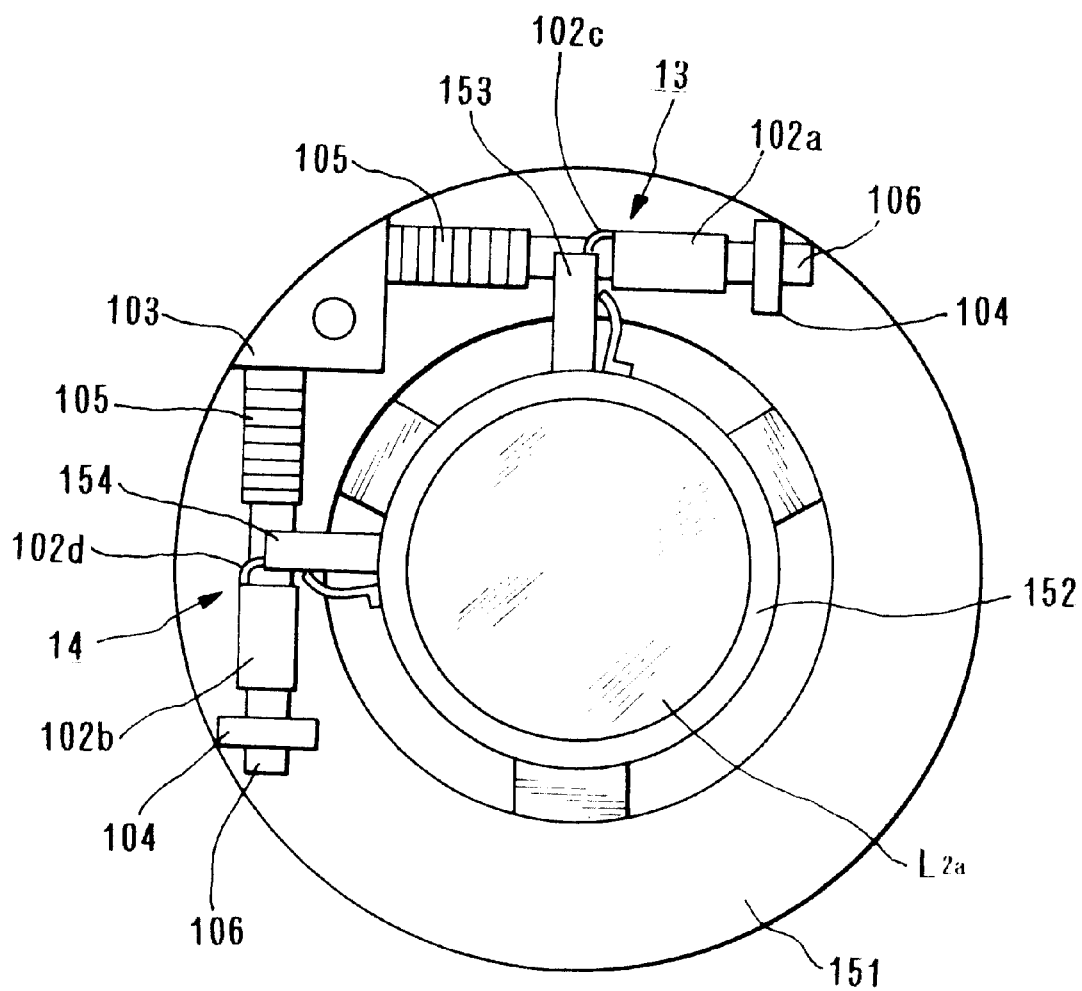
FIG. 6 is a front view showing an example of the structural parts which move the blur correction lens unit in the X-axis direction and Y-axis direction.

FIG. 6 is a front view showing the structure for holding and moving lens unit L2a; the actuator comprises an X-axis actuator 13 and Y-axis actuator 14 similar to the aforesaid actuator 100. Therefore, blur correction lens unit L2a is movable in the X-axis direction and the Y-axis direction. In FIG. 6, reference number 151 refers to a frame holding the barrel of blur correction lens unit L2a, and reference number 152 refers to the barrel of blur correction lens unit L2a. The X-axis actuator 13 and Y-axis actuator 14 are disposed above frame 151 in the X-axis direction and Y-axis direction, respectively, and extension 102c of the slider block 102a of X-axis actuator 13, and extension 102d of slider block 102b of Y-axis actuator 14 engage the working members 153 and 154 of barrel 152. Structural element identical to those of the previously described actuator 100 are identified by identical reference numbers and are not discussed further.

Although the movement of the extension 102c of X-axis actuator 13 in the X-axis direction is transmitted to the working member 153 in integrated movement, the movement of the working member 153 in the Y-axis direction does not restrain extension 102c. Furthermore, although the movement of the extension 102d of Y-axis actuator 14 in the Y-axis direction is transmitted to the working member 154 in integrated movement, the movement of the working member 154 in the X-axis direction does not restrain extension 102d.

According to the aforesaid construction, the movement of slider block 102a and working member 153 in the X-axis direction via the operation of the X-axis actuator 13 is transmitted to barrel 152 via extension 102c and working member 153 so as to move barrel 152 in the X-axis direction. Furthermore, the movement of slider block 102b and working member 154 in the Y-axis direction via the operation of the Y-axis actuator 14 is transmitted to barrel 152 via extension 102d and working member 154 so as to move barrel 152 in the Y-axis direction.

Figure 7:
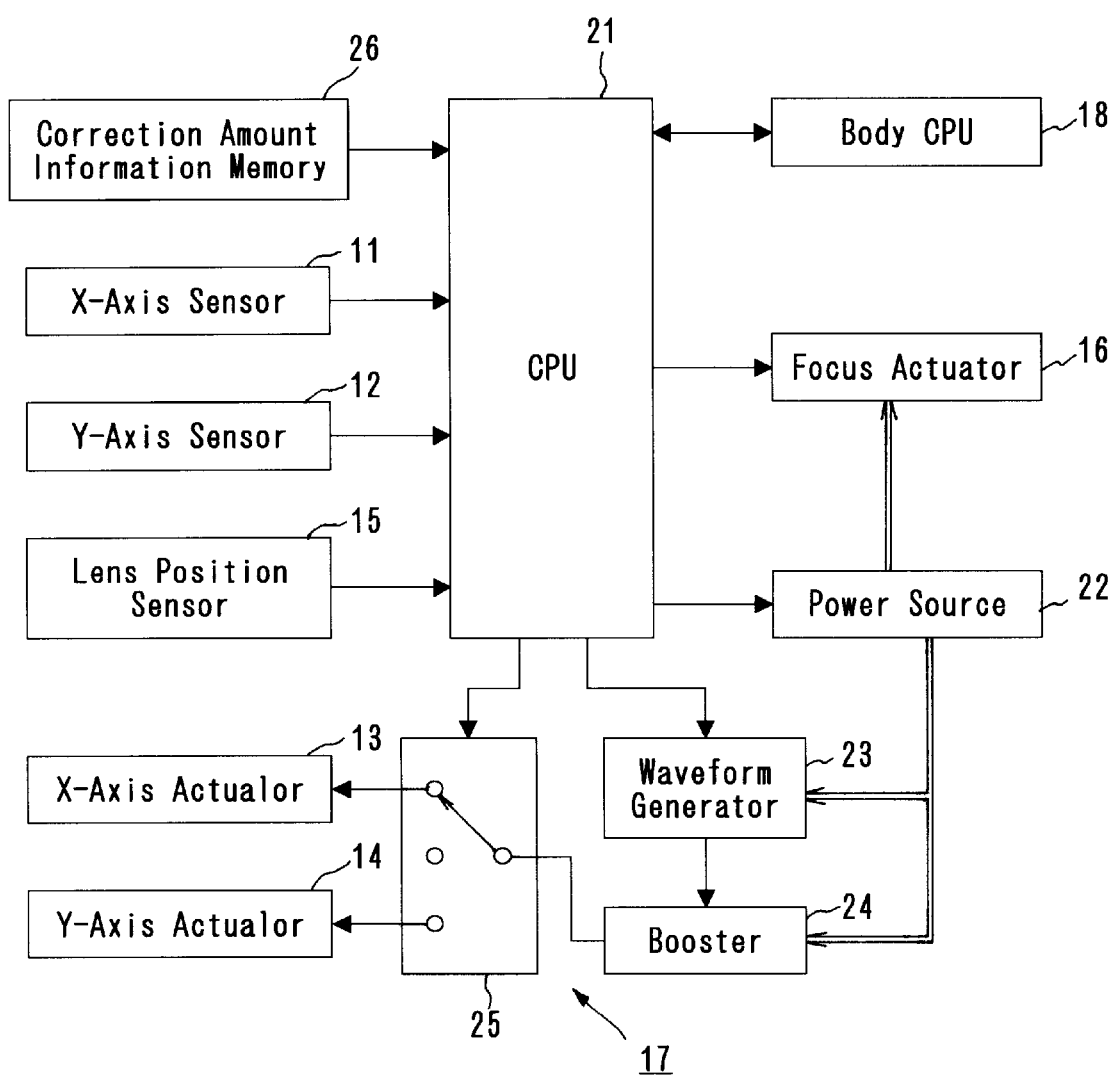
FIG. 7 is a block diagram of the circuit construction of the lens controller.

FIG. 7 is a block diagram showing the circuit construction of the lens controller 17. Lens controller 17 comprises a lens control CPU 21, waveform generator 23, booster 24, switching circuit 25, and correction information memory 26. Correction information memory 26 stores correction information to correct shifting of the focal plane. That is, in the present embodiment, the distance between the focal length at the wide angle end of the zoom lens unit and the focal length at the telephoto end thereof is divided into a plurality of zones. Then, the change in the focal length caused by a zooming operation is treated as movement from one zone to another zone. Correction information for correcting focal plane shift related to each zone is determined beforehand and stored in correction information memory 26.

CPU 21 is constructed so as to be capable of mutual exchange of control signals with body CPU 18. X-axis sensor 11, Y-axis sensor 12, and lens element position sensor 15 are connected to the input port of CPU 21, and focus actuator 16, and switching circuit 25 are connected to the output port of CPU 21. X-axis actuator 13 and Y-axis actuator 14 are connected to CPU 21 via switching circuit 25.

Power unit 22 supplies electrical power to focus actuator 16, and Y-axis actuator 13 and Y-axis actuator 14 under the control of CPU 21. Furthermore, waveform generator 23 and booster 24 receive electrical power from power unit 22, and waveform generator 23 outputs a drive pulse of suitable waveform to drive X-axis actuator 13 and Y-axis actuator 14 under the control of CPU 21. Booster 24 boosts the drive pulse output from waveform generator 23 to a predetermined voltage, which is output X-axis actuator 13 and Y-axis actuator 14 via switching circuit 25.

Therefore, in the present embodiment, a single power unit 22 can be used commonly by the focus actuator 16, X-axis actuator 13, and Y-axis actuator 14, thereby reducing costs.

Figure 8:
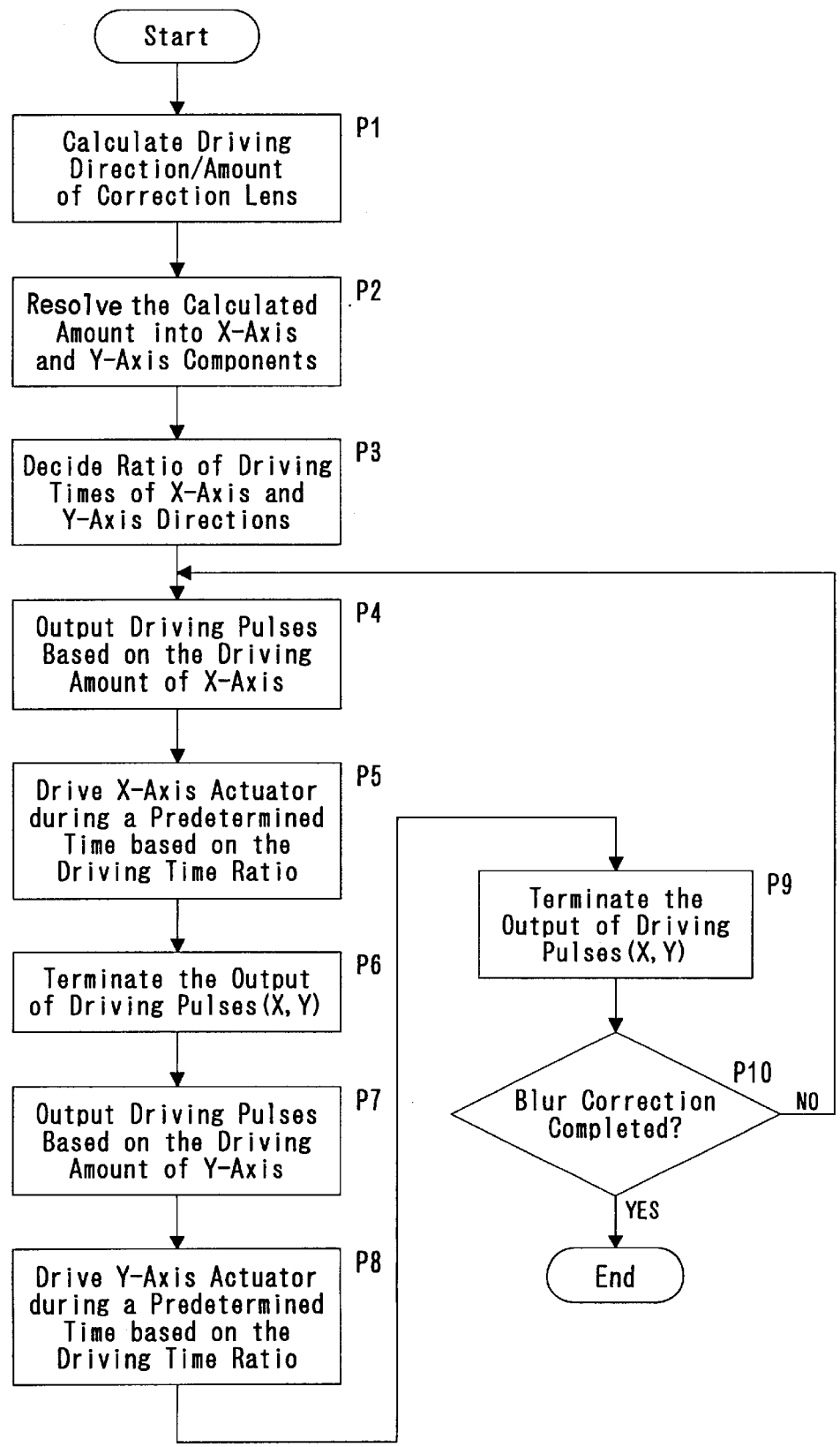
FIG. 8 is a flow chart illustrating the blur correction control operation of the lens controller.

Correction of image blur among the aforesaid controls executed by CPU 21 is described hereinafter with reference to the flow chart of FIG. 8. First, upon confirmation the correction of image blur is permitted, the correction lens drive direction symbol (positive or negative direction) and drive amount are calculated based on the blur correction signals detected by a known detection device (Step P1). The calculated drive amount is resolved to an X-axis direction drive amount and a Y-axis direction drive amount (Step P2), and the ratio of the X-axis drive time and the Y-axis drive time are calculated from the X-axis direction drive amount and Y-axis direction drive amount (Step P3).

Switching circuit 25 is switched based on the ratio of the calculated drive times to alternately drive the X-axis actuator 13 and Y-axis actuator 14.

That is, the output of a drive pulse of suitable waveform to drive the X-axis actuator 13 is specified and transmitted to waveform generator 23 based on the drive direction symbol (positive or negative) and the drive amount calculated in the X-axis direction, and booster 24 outputs a boosted drive pulse (Step P4). Switching circuit 25 is switched based on the ratio of the calculated drive times, and the X-axis actuator 13 is driven for a predetermined time (Step P5). After aforesaid predetermined drive time has elapsed, switching circuit 25 is switched, and the drive pulse output from booster 24 to the X-axis actuator 13 and Y-axis actuator 14 is interrupted (Step P6).

The output of a drive pulse of suitable waveform to drive the Y-axis actuator 14 is specified and transmitted to waveform generator 23 based on the drive direction symbol (positive or negative) and the drive amount calculated in the Y-axis direction, and booster 24 outputs a boosted drive pulse (Step P7). Switching circuit 25 is switched based on the ratio of the calculated drive times, and the Y-axis actuator 14 is driven for a predetermined time (Step P8). After aforesaid predetermined drive time has elapsed, switching circuit 25 is switched, and the drive pulse output from booster 24 to the X-axis actuator 13 and Y-axis actuator 14 is interrupted (Step P9).

The end of blur correction is determined from the position of the blur correction lens unit L2a detected by X-axis sensor 11 and Y-axis sensor 12, and the previously calculated drive amount in the X-axis direction and drive amount in the Y-axis direction (Step P10). When it is determined that blur correction has not been completed, the routine returns to step P4, and the correction operation continues, whereas the correction operation ends when it has been determined that blur correction has been completed.

Figure 9:
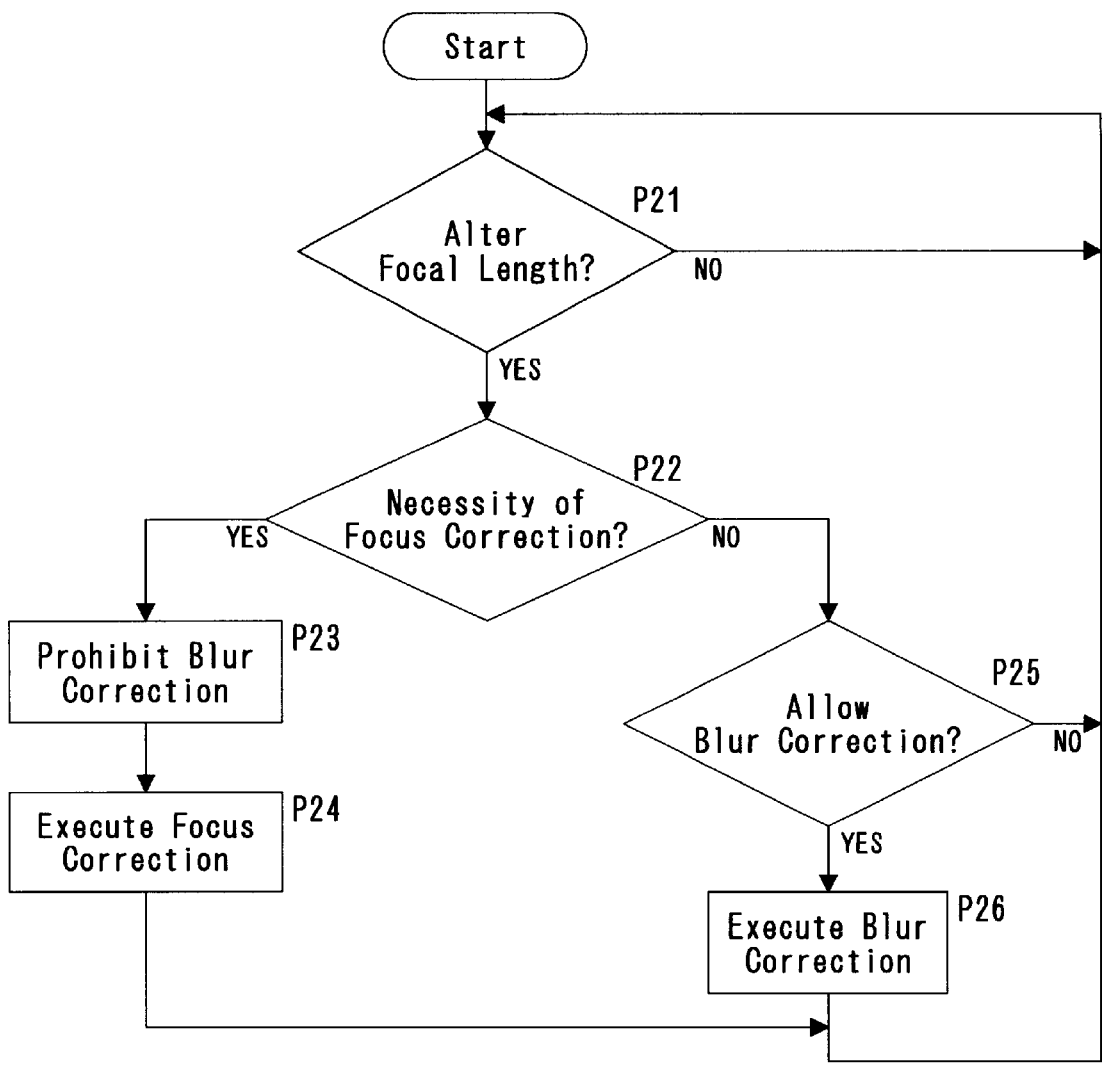
FIG. 9 is a flow chart illustrating the electronic correction control operation for blurring of the focal plane by the lens controller.

Electronic correction of shifting of the focal plane in conjunction with the zooming operation among the control operations executed by CPU 21 of the lens controller 17 is described hereinafter with reference to the flow chart of FIG. 9. First, a determination is made as to whether or not the lens focal length has changed due to a zooming operation (Step P21). That is, a determination is made as to whether or not the focal length has changed from one zone to another zone. When the focal length has not changed, the routine returns to step P21. When the focal length has changed, a determination is made as to whether or not correction is required for focal plane shift from the changed focal length information and the current position information of the focusing lens (Step P22).

When it is determined that correction is required for focal plane shift by the determination of step P22, first, blur correction is terminated (Step P23). Then, the amount of movement of the focusing lens is calculated based on the focal length information changed by the zooming operation, the current position information of the focusing lens, and the correction information for correcting focal plane shift previously stored in correction information memory 26 (Step P24). After this processing ends, the routine returns to step P21.

When it is determined that correction is not required to correct focal plane shift by the determination of step P22, a determination is made as to whether or not blur correction is permitted (Step P25). Blur correction is permitted when the driving of the focusing lens has ended. This permission provides that blur correction is executed after awaiting the end of the driving of the focusing lens to correct focal plane shift, so as not to simultaneously execute both focal plane shift correction and blur correction.

When it is determined that blur correction is not permitted in the determination of step P25, the routine returns to step P21, whereas blur correction is executed when blur correction is permitted (P26), then the routine returns to step P21.

Figure 10:
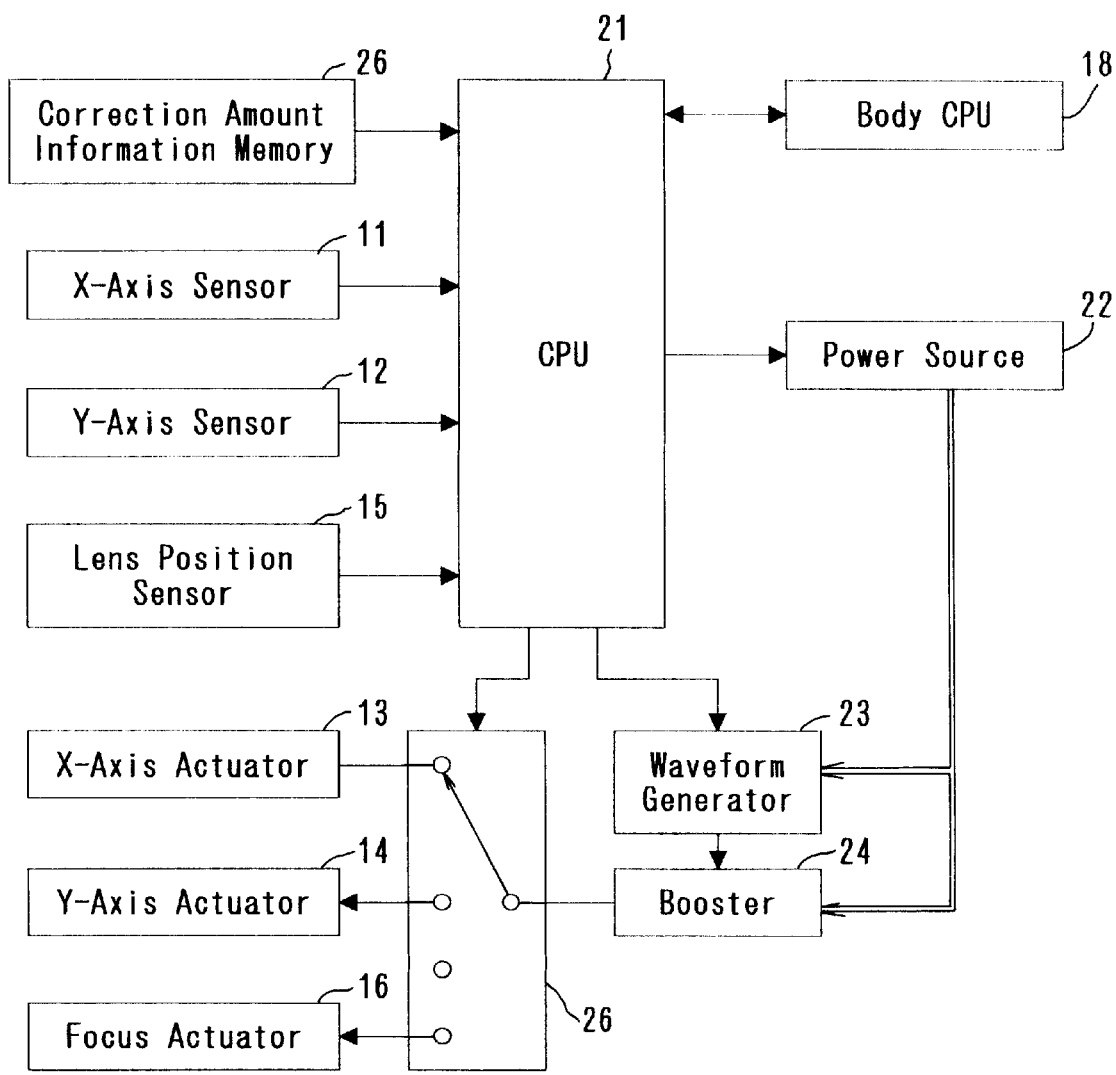
FIG. 10 is a block diagram showing another example of a circuit construction of the lens controller.

FIG. 10 is a block diagram showing a modification of the circuit construction of lens controller 17. Whereas the focus actuator 16 is constructed so as to be directly controlled by CPU 21 in the circuit shown in FIG. 7, in the circuit shown in FIG. 10, the focus actuator 16 as well as the X-axis actuator 13 and Y-axis actuator 14 are connected to the CPU 21 via the same switching circuit 26. In other respects the circuit of FIG. 10 is identical to the circuit of FIG. 7 and the similarities are not discussed further. Blur correction also is not permitted by the circuit of FIG. 10 unless the drive of the focusing lens for correction of focal plane shift has ended.

The embodiment described above provides a plurality of lens driving devices arranged so as to independently drive a plurality of lens units in a lens system, and a drive power source used commonly by said plurality of lens drive devices, and a drive controller to control the operation of a plurality of lens driving devices. The drive controller executes controls so as to terminate the connection of remaining lens drive devices to the drive power source when one lens drive device must be driven based on predetermined conditions set in the lens system. Therefore, the load on the drive power source is reduced, and the load on the drive controller to perform calculations also is reduced.

In the present embodiment, when it is necessary to correct focal plane shift caused by a zooming operation, controls are executed to prevent blur correction, thereby reducing the load on the power source as well as reducing the load on the CPU 21 to perform calculations. This arrangement improves responsiveness when correcting focal plane shift of the zoom lens system caused by a zooming operation, and provides a zoom lens system which provides the camera operator with an excellent sense of operation.

The present embodiment provides that controls are executed to prevent the operation of the blur correction device so as to not execute blur correction by the blur correction device when the focal plane correction device is executing focal plane correction, in a device for use in cameras having a focal plane correction device for correcting movement of the focal plane by calculating the movement of the focal plane in conjunction with the change in the focal length and moving the focus adjustment lens unit based on said calculation result, and a blur correction device for correcting image blur caused by vibration by moving the blur correction lens unit. Accordingly, the load on the drive power source is reduced, and the load on the drive controller to perform calculations also is reduced.

The present embodiment further provides that controls are executed to prevent the operation of the blur correction device so as to not execute blur correction by the blur correction device when the focal plane correction device is executing focal plane correction, in apparatuses having a focal plane correction device for correcting movement of the focal plane by calculating the movement of the focal plane in conjunction with the change in the focal length and moving the focus adjustment lens unit based on said calculation result, and a blur correction device for correcting image blur caused by vibration by moving the blur correction lens unit. Accordingly, the load on the drive power source is reduced, and the load on the drive controller to perform calculations also is reduced.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An apparatus comprising:
    a plurality of lens units;
    a plurality of lens driving devices arranged so as to independently drive said plurality of lens units, said plurality of lens driving devices using electric power supplied by a common power source; and
    a drive controller which controls the operation of the plurality of lens driving devices in such a manner that, when one lens driving device must be driven, the connection of the remainder of the lens driving devices to the drive power source is terminated.

2. An apparatus as claimed in claim 1, wherein said apparatus comprises a zoom lens system and said lens driving devices include a first driving device used during zooming of the zoom lens system and a second driving device used for correcting an image blurring caused by a vibration of the zoom lens system.

3. An apparatus as claimed in claim 2, wherein said first driving device is used for correcting focal plane shift caused by a focal length variation during zooming of the zoom lens system.

4. An apparatus as claimed in claim 3, wherein said drive controller executes the control in which, when the first driving device is connected to the common power source, the connection of the second driving device to the common power source is inhibited.

5. A lens drive control device comprising:
    a plurality of lens driving devices arranged so as to independently drive said plurality of lens units, said plurality of lens driving devices using electric power supplied by a common power source; and
    a drive controller which controls the operation of the plurality of lens driving devices in such a manner that, when one lens driving device must be driven, the connection of the remainder of the lens driving devices to the drive power source is terminated.

6. A lens drive control device as claimed in claim 5, wherein said lens drive control device is used in an apparatus comprising a zoom lens system and said lens driving devices include a first driving device used during zooming of the zoom lens system and a second driving device used for correcting an image blurring caused by a vibration of the zoom lens system.

7. A lens drive control device as claimed in claim 6, wherein said first driving device is used for correcting focal plane shift caused by a focal length variation during zooming of the zoom lens system.

8. A lens drive control device as claimed in claim 7, wherein said drive controller executes the control in which, when the first driving device is connected to the common power source, the connection of the second driving device to the common power source is inhibited.

* * * * *